United States Patent Office 3,549,711
Patented Dec. 22, 1970

3,549,711
HALOETHERS
Claude I. Merrill, Lancaster, Calif., and Norman L. Madison, Midland, Mich., assignors to The Dow Chemical Company, Midland, Mich., a corporation of Delaware
No Drawing. Filed June 20, 1967, Ser. No. 647,334
Int. Cl. C07c 43/28
U.S. Cl. 260—614
2 Claims

ABSTRACT OF THE DISCLOSURE

Novel haloethers and a method of their preparation are disclosed. These compounds exhibit an excellent thermal stability and oxidation resistant characteristics when subjected to elevated temperatures.

BACKGROUND OF THE INVENTION

This invention relates to novel halogenated ether compounds containing fluorine and more particularly is concerned with perfluoroalkyl aliphatic and alkaryl ethers and to a method of their preparation.

SUMMARY

The present invention comprises halogenated mixed ethers corresponding to the general Formula I and bis ethers corresponding to the general Formula II (I) ROR'       (II) R(OR')$_2$ wherein R is an aliphatic or alkaryl group having from 1 to about 20 carbon atoms, and R$_2$ is a perhaloaliphatic group having from 1 to about 20 carbon atoms, preferably containing from 1 to about 6 carbon atoms.

These compounds are prepared by reacting a perhaloalkoxide source material with an organic halide such as, for example, aliphatic or alkaryl halides in the presence of an alkali metal fluoride.

DESCRIPTION OF PREFERRED EMBODIMENTS

A preferred embodiment of the present invention comprises mixed perfluoroalkyl aliphatic and alkaryl ethers. The heptafluoroisopropyl aliphatic and benzyl ethers are examples of specific preferred embodiments of the present invention.

The novel compounds possess good thermal and oxidation resistance. They find utility as brake and other hydraulic fluids, electrical insulators, monomers for the preparation of heat and oxidation resistant polymers and the like applications wherein thermal and oxidative stability are required at elevated temperatures. Additionally they are both oleopholic and hydrophobic thus finding application as oil and water repellants.

In accordance with the present invention, the novel compounds of the preferred embodiment ordinarily are prepared by reacting an aliphatic or alkaryl halide as set forth hereinbefore with an alkoxide source material such as perhaloketone or a perfluoroacyl fluoride in the presence of an alkali metal fluoride, particularly for example, potassium fluoride, cesium fluoride or rubidium fluoride and an inert aprotic organic polar solvent.

Usually, an addition product of the alkoxide source material, e.g. an alkyl or cycloalkyl perfluoroketone and alkali metal fluoride is prepared by direct reaction of these reactants. The quantity of alkali metal fluoride to be employed at a minimum is about that required stoichiometrically for reaction with the ketone to form a 1:1 addition product. An excess of the alkali metal fluoride up to about 500 weight percent of that required stoichiometrically can be used. Ordinarily about stoichiometric quantities are employed.

The resulting addition product reactant and organic halides in the presence of the inert solvent usually are maintained under the autogenous pressure generated by the reaction mass at a temperature of from about 0 to about 150° C., usually at from about 50° C. to about 100° C. for a period of from about 0.25 to about 100 hours or more and ordinarily from about 2 to about 24 hours. In most operations, the reaction mass is continuously agitated during this period.

Alternatively, the organic halide reactant, alkoxide source material and alkali metal fluoride can be introduced at the same time into a reaction vessel along with the solvent. It is not necessary to first separately prepare the carbonyl-alkali metal addition product.

Following the reaction period, usually the product mass is washed with water and the corresponding ether recovered and purified as by fractional distillation, vapor phase chromatography or other liquid-liquid separatory procedures.

The relative quantities of organic halide reactant and alkoxide source material to be employed are not critical; usually at a minimum about stoichiometric amounts as needed to provide the alkoxy product are used. An excess of either reactant may be used depending upon the final product desired. The actual quantities employed are those such that unwieldly large volumes are not encountered which would require large storage vessels, transportation systems and reactors.

Alkoxide source materials suitable for use in the present invention are the perhalo alcoholates, such as e.g. the alkali metal methylates, ethylates, propylates, cyclobutylates, cyclopentylates and cyclohexylates (i.e. alkali metal alkoxides), perhaloketones, perhalogenated acid halides which form an anion, e.g. carbonyl fluoride and perfluoroacetyl fluoride, and the like. Specific examples of suitable ketone reactants are perfluoroacetone, perchloroacetone, mixed perhalosubstituted acetones such as dichlorotetrafluoroacetone, tetrachlorodifluoroacetone and monochloropentafluoroacetone, perfluorocyclobutanone, perfluorocyclopentanone, perfluorocyclohexanone, and the like.

Organic halides found to be particularly suitable for use in the present invention are the alkyl bromides and iodides, alkyl chlorobromides, alkaryl bromides, alkyl dibromides and substituted alkyl bromides. Specific examples of operable halide reactants are methyl bromide (CH$_3$Br), methyl iodide (CH$_3$I), ethyl bromide (C$_2$H$_5$Br), n-propyl bromide (C$_3$H$_7$Br), isopropyl bromide [(CH$_3$)$_2$CHBr], ethylene dibromide (BrSH$_2$CH$_2$Br)

benzyl bromide (C$_6$H$_5$CH$_2$Br), hexamethylene dibromide (BrCH$_2$(CH$_2$)$_4$CH$_2$Br), tetramethylene bromonitrile (BrCH$_2$(CH$_2$)$_3$CN)

bromochloromethane (BrClCH$_2$), bromomethyl acetate

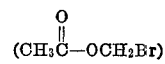

bromobutyl acetate

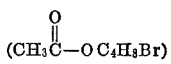

decamethylene dibromide (BrCH$_2$(CH$_2$)$_8$CH$_2$Br), phenyl ethyl bromide (C$_6$H$_5$CH$_2$CH$_2$Br), aryl sulfonate esters and the like.

Solvents suitable for use are those aprotic polar organic liquids which are inert to the reactants and product and which will dissolve these materials. Conveniently, the higher boiling ethers such as β,β-dimethoxy-diethyl ether (commonly referred to as diglyme), N,N-dimethylformamide, acetonitrile, tetramethylene sulfone, N,N-dimethylacetamide and the like are employed as solvents.

The process usually is carried out under the autogenous pressure of the reaction mixture but either higher or lower pressures can be used. For example, atmospheric pressures can be used when a condensor is employed to reflux the volatile reactants back into the reaction mixture.

The following examples will serve to further illustrate the present invention but are not meant to limit it thereto.

EXAMPLE 1

About 29 grams (~0.5 gram mole) of substantially anhydrous potassium fluoride and 88 grams (0.5 gram mole of hexafluoroacetone,

in about 250 milliliters of diglyme solvent were reacted at room temperature for about 0.5 hour in a pressure vessel reactor. After this period about 59 milliliters (84.8 grams, 0.5 gram mole) of benzyl bromide ($C_6H_5CH_2Br$) was added by syringe to the diglyme solution of the 1:1 adduct of

The reaction mixture was maintained under its autogenous pressure for about 24 hours at room temperature. After the reaction period, the product was extracted with water and an oily layer weighing about 115 grams was recovered.

Purification by vapor phase chromatography indicated that this layer contained some unreacted benzyl bromide and about 60% yield of benzyl heptafluoroisopropyl ether [$C_6H_5CH_2OCF(CF_3)_2$]. The structure of this novel product was shown by the following analyses.

Elemental chemical analysis gave C—43.6%; H—2.81%; F—7.6%. Theoretical calculated analysis for the ether is C—43.5%; H—2.56%; F—8.2%.

The infrared spectrum showed absorbancy peaks at 3.72, 5.63, 5.81, 6.30, 6.74, 6.94, 7.75, 8.10, 8.30, 8.57, 8.80, 9.02, 9.36, 9.71, 10.05, 10.70, 11.47, 12.33, 12.59, 12.89, 13.75, 14.05, 14.38 and 14.62 microns.

Mass spectral data showed the following: $C_6H_5CH_2^+$, M+ (molecular ion) $C_6H_5CHOCF(CF_3)_2^+$, $C_3F_7^+$, $CF_3^+$, $C_6H_5CH_2O^+$, $C_6H_5CHOC_2F_4^+$.

These data are consistent with the assigned structure.

Nuclear magnetic resonance analysis showed:

(H+ characteristic of phenyl and benzyl groups)
(Fluorine relative to $CFCl_3$ for $F^{19}$)

+79.26 doublet ($CF_3$)
+142.4 heptet (CF)
$JCF-CF_3=2.4$ cps.

These data also are consistent with and support the ether structure.

EXAMPLE 2

About 6 grams (0.1 gram mole) of finely divided (60 mesh) potassium fluoride was added to a pressure vessel reactor along with about 200 milliliters of substantially anhydrous acetonitrile. These additions were made in a dry box. The pressure vessel was cooled to about minus 196° C. and pumped out on a vacuum line after which about 8.7 grams (0.075 gram mole) of perfluoroacetyl fluoride

was transferred into the reactor. The reactor was sealed, warmed to room temperature and stirred for about 16 hours. The course of reaction was followed and it was evident that the formation of the 1:1 adduct of

was substantially complete after about 2 hours.

About 17.7 grams (0.013 gram mole) of benzyl bromide was added by syringe and the reactor again closed. The reaction mixture was stirred for about 18 hours while being maintained at a temperature of about 50° C. The reaction appeared to be substantially complete after this time but was allowed to remain under agitation at the reaction temperature for a total of about 42 hours.

The resulting product was extracted four times with water, separated and dried over magnesium sulfate. Product yield of benzyl pentafluoroethyl ether was about 83%.

The product was purified by vapor phase chromatography; the structure was established by the following analyses.

Elemental chemical analysis give C—48.8%; H—3.3%. Theoretical calculated analysis for the ether is C—47.8%; H—3.1%.

Nuclear magnetic resonance data:

(Relative to $CFCl_3$ for $F^{19}$)

+90.8 ($OCF_2$)
+86.6 ($CF_3$)

(Relative to tetramethylsilane for $H^1$)

−4.8 ($CH_2$)
−7.2 (5CH)

Mass spectral data gave in order of decreasing intensities: $C_6H_5CH_2^+$, M+, $C_6H_5CHOC_2H_5^+$, $CF_2OCH^+$, $C_2F_5^+$, $CF_3^+$.

Following the same general procedure as described directly hereinbefore about 7.25 grams (0.125 gram mole) of potassium fluoride and 8.25 grams (0.125 gram mole) of carbonyl fluoride

were reacted in 200 milliliters of acetonitrile. The resulting 1:1 adduct

was reacted with about 21.4 grams (0.125 gram mole) of benzyl bromide at a temperature of about 50–55° C. for about 18 hours.

About 19.5 grams of product was recovered by water extraction. This is indicative of about 88% yield of benzyl trifluoromethyl ether.

After purification by vapor phase chromatography, the compound structure was proved by the following analyses.

Elemental chemical analysis indicated C—54.7%; H—4.2%. Theoretical calculated analysis for the ether, $C_6H_5CH_2OCF_3$, is C—54.6%; H—4.0%.

Nuclear magnetic resonance data gave:

(Relative to $CFCl_3$ for $F^{19}$)

+61.3 ($OCF_3$)

Mass spectral data in order of decreasing intensity showed $C_6H_5CH_2^+$, M+, $C_6H_5CHOCF_3^+$, $CF_3^+$, $C_4H_3^+$, $C_3H_3^+$, $C_6H_5^+$, $C_5F_4^+$, $CF_2^+$.

EXAMPLE 3

A number of ethers were prepared by reacting the 1:1 adduct of potassium fluoride and hexafluoroacetone with alkyl halides.

In these preparations, the adducts were prepared following the general procedure set forth hereinbefore.

The alkyl halide reactant was added to the resulting solution and the reaction mass agitated for a predetermined time at a given reaction temperature and the ether product recovered, purified and identified following the general procedures set forth in the preceding examples.

Table I which follows summarizes the data for each run. Table II presents analytical data obtained substantiating the structure of the ether compounds. The run numbers in both tables refer to the same preparation.

Proof of structure was shown by analysis:

Elemental chemical analysis gave C—34.3%; H—2.8%; F—55.7%. Theoretical analysis for the ether is C—35.0% H—2.9%; F—55.4%.

Mass spectral data showed in order of decreasing in-

TABLE I

| | Reactants | | | Solvent | | Reaction conditions | | Product yield (percent) |
|---|---|---|---|---|---|---|---|---|
| | $KF(CF_3)_2CO$ (gram mole) | Alkyl Halide | | | | | | |
| | | Type | Amount (gram mole) | Type | Amount (ml.) | Time (hrs.) | Temp., °C. | |
| Run No.: | | | | | | | | |
| 1a | 0.05 | $CH_3Br$ | 0.05 | Diglyme | 100 | 16 | 100 | ~80 |
| 1b | 0.05 | $CH_3I$ | 0.05 | do | 100 | 3 | 100 | ~100 |
| 2 | 0.44 | $n$-$C_3H_7Br$ | 0.44 | do | 300 | 24 | 100 | ~90 |
| 3 | 0.25 | iso-$CH_3H_7Br$ | 0.25 | do | 250 | 24 | 100 | ~50 |
| 4 | 0.50 | $BrCH_2CH_2Br$ | 1.0 | do | 250 | 24 | 100 | ~65 |
| 5 | *0.5 | $CH_2ClBr$ | 0.5 | do | 150 | 48 | 100 | |
| 6 | ~0.4 | $BrCH_2(CH_2)_4CH_2Br$ | ~0.18 | Acetonitrile | 25 | 18 | 125 | ~78 |
| 7 | 0.50 | $BrCH_2O\overset{O}{\overset{\|}{C}}CH_3$ | 0.33 | Diglyme | 300 | 24 | ~18-25 | ~25 |
| 8 | 0.13 | $BrCH_2(CH_2)_8CH_2Br$ | 0.33 | do | 300 | 24 | 100 | |
| 9 | 0.36 | $BrCH_2(CH_2)_3CN$ | 1.0 | do | 250 | 48 | 100 | |
| 10 | 0.36 | $CH_2Br_2$ | 1.0 | do | 250 | 48 | 100 | |
| 11 | 0.034 | $BrCH_2CH_2Br$ | 0.017 | Acetonitrile | 50 | 80 | 95 | ~40 |

*Cesium fluoride was used as the alkali metal fluoride.

TABLE II
[Elemental chemical analysis (percent)]

| | | C | | H | | F | | | |
|---|---|---|---|---|---|---|---|---|---|
| Run No. | Ether product | Found | Theoretical | Found | Theoretical | Found | Theoretical | Mass Spectral Data (1) | Other |
| 1a | Heptafluoroisopropyl methyl ether | 24.05 | 24.0 | 1.4 | 1.5 | 66.6 | 66.5 | $CH_3^+$, $CH_3OC_2F_4^+$, $CF_3^+$, $CF_3CO^+$, $CH_3O^+$, $C_3F_5O^+$, $CH_3OC_3F_6^+$, $M^+$ | (2) |
| 1b | do | | | | (Product analysis consistent with that of Run 1a) | | | | |
| 2 | n-Propyl heptafluoroisopropyl ether | 31.3 | 31.6 | 3.38 | 3.07 | 58.3 | 58.3 | $C_3H_7^+$, $C_2H_5^+$, $CF_3^+$, $CH_2OC_3H_7^+$, $COF^+$, $CH_2OCF^+$, $C_3F_7^+$, $C_3H_6OC_3F_7^+$ | |
| 3 | Isopropyl heptafluoroisopropyl ether | 31.6 | 31.6 | 3.90 | 3.07 | | | $C_2H_4OC_3F_7^+$, $C_3H_7^+$, $COF^+$, $CF_3^+$, $C_3F_7^+$, $M^+$ | |
| 4 | 2-bromoethyl heptafluoroisopropyl ether | 20.6 | 20.3 | 1.42 | 1.50 | | | $BrCH_2CH_2^+$, $C_3F_7OCH_2CH_2^+$, $CF_3^+$, $FCO^+$, $(CF_3)_2CFOCH_2^+$, $M^+$, $CH_2Br^+$, $C_3F_7^+$ | (3) |
| 5 | Heptafluoroisopropyl chloromethyl ether | 21.7 | 20.3 | 1.6 | 1.7 | 53.0 | 56.7 | | (4) |
| 6 | 1,6-bis(heptafluoroisopropoxy)hexane | 31.2 | 31.5 | 2.63 | 2.68 | 58.6 | 58.7 | | (5) |
| 7 | (Heptafluoroisopropoxy)methyl acetate | 28.5 | 27.9 | 2.37 | 1.94 | 52.0 | 51.6 | | (6) |
| 8 | 10-bromodecyl heptafluoroisopropyl ether | 39.2 | 38.5 | 4.97 | 4.94 | 32.8 | 32.9 | | (7) |
| 9 | 4-cyanobutyl heptafluoroisopropyl ether | | | | | | | | (8) |
| 10 | bis(heptafluoroisopropoxy)methane | 22.1 | 21.9 | 0.78 | 0.51 | 68.35 | 69.35 | | (9) |
| 11 | Bis(heptafluoroisopropoxy)ethane | 24.3 | 24.1 | 1.02 | 1.01 | | | $FCO^+$, $(CF_3)_2CFOCH_2CH_2^+$, $CF_3^+$, $C_3F_7^+$, $CF_3CFOCH_2^+$, $C_2F_3O^+$, $M^+$ | |

1 Species in order of decreasing intensity.
2 Mol. wt. Exp.—206; Theo. 200.
3 B.P. (atm.) 104–105.
4 B.P. (atm.) 61.0° C. Cl (Found), 14.53%, Theoretical, 15.0%.
5 B.P., 26–27° C./<1 mm.
6 B.P. 50° C./22 mm.
7 Br (Found), 19.5%; Theoretical, 19.7%.
8 B.P. 86.5–87.5° C./10 mm.
9 Mol. wt. (vapor density) 370; Theoretical, 381, B.P. 51–52° C./290 mm.

Nuclear magnetic resonance data and the infrared spectrum in all cases supported the assigned structure.

EXAMPLE 4

(a) About 40.6 grams (0.172 gram mole) of potassium perfluorocyclobutoxide ( ⟨F⟩·OK and 21.2 grams (0.172 gram mole) of n-propyl bromide in 300 milliliters of diglyme solvent were reacted in a sealed pressure vessel at about 100° C. for 24 hours following the same general procedure described in the preceding examples. (The potassium perfluorocyclobutoxide reactant was prepared by placing about 10.6 grams of KF and a small amount of solvent into the pressure vessel, cooling to about minus 196° C., evacuating and transferring about 48.2 grams of fluorosulfatoperfluorocyclobutane into the vessel.) The reactor was sealed, warmed to room temperature and maintained at this temperature for about 1.5 hours.

The oil product was removed from the reactor, extracted with water, dried and purified by vapor phase chromatography. Product yield of n-propyl heptafluorocyclobutyl ether (n-$C_3H_7O$ ⟨F⟩ ) was about 42%.

tensities: $C_3H_7^+$, $C_3H_5^+$, $C_3F_5^+$, $C_4F_7^+$, $C_2H_4OC_4F_7^+$, $C_4F_6^+$, $CH_2OC_4F_7^+$, $C_3H_6OC_4F_7^+$, $M^+$.

Nuclear magnetic resonance data and the infrared spectrum support the assigned structure.

(b) Following this same procedure, about 29.8 grams (0.125 gram mole) of ⟨F⟩·OK and 21.6 grams (0.13 gram mole) of benzyl bromide in about 250 milliliters of diglyme were stirred in a sealed pressure vessel reactor for about 72 hours at room temperature. The oil product was extracted and washed with water followed by purification using vapor phase chromatographic techniques.

Elemental analysis showed C—44.4%; H—3.0%. Theoretical calculated analysis for benzyl heptafluorocyclobutyl ether, $C_6H_5CH_2O$ ⟨F⟩ , is C—45.8%, H—2.4%.

Mass spectral data are in descending order of intensities: $C_6H_5CH_2^+$, $C_2FO^+$, $C_3F_5^+$, $C_6H_5^+$, $M^+$, $CF^+$.

Nuclear magnetic resonance data indicated:

(Relative to $CFCl_3$ for $F^{19}$)

+138.0 (OCF)   +130.7 (2CF)
+130.2 (2CF)   +132.3 (2CF)

(Relative to tetramethylsilane for $H^1$)

−7.22 ($C_6H_5$)   −4.91 ($CH_2$)

(c) About 2.2 grams (0.038 gram mole) of potassium fluoride and 10.7 grams (0.033 gram mole) of fluorosulfatoperfluorocyclopentane were reacted in 125 milliliters of diglyme at room temperature in a sealed reactor to prepare the corresponding potassium perfluorocyclopentoxide. About 5.6 grams (0.033 gram mole) of benzyl bromide was introduced into the reactor, the reactor again sealed and heated with agitation at about 55° C. for 18 hours. The resultant product was washed three times with water and dried producing about 10.4 grams of the product, benzyl nonafluorocyclopentyl ether.

The product was purified by vapor phase chromatography and analyzed.

Nuclear magnetic resonance data and infrared spectrum support the assigned structure of the benzyl nonafluorocyclopentyl ether, $C_6H_5CH_2O$ 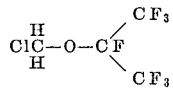 .

(d) In another preparation about 2.3 grams of potassium fluoride and 6.28 grams of fluorosulfatoperfluorocyclohexane, 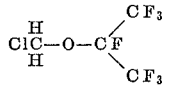 $OSO_2F$, in 100 milliliters of diglyme were reacted at room temperature to prepare the corresponding potassium cycloalkoxide. About 2.84 grams of benzyl bromide were added to the reactor and the reaction mass heated at from about 50–55° C. for 16 hours with constant agitation.

The oil product was recovered by water extraction, dried and purified by vapor phase chromatography. Product yield was about 5.2 grams, this being almost quantitative for the expected product, benzyl undecylfluorocyclohexyl ether, $C_6H_5CH_2O$ ⟨F⟩ . Analysis supported the assigned structure.

Various modifications can be made in the present invention without departing from the spirit or scope thereof for it is understood that we limit ourselves only as defined in the appended claims.

We claim:
1. A halogenated ether corresponding to the formula:

$$ClC\overset{H}{\underset{H}{-}}-O-CF\begin{smallmatrix}CF_3\\CF_3\end{smallmatrix}$$

2. A process for the preparation of a halogenated ether corresponding to the formula:

$$ClC\overset{H}{\underset{H}{-}}-O-CF\begin{smallmatrix}CF_3\\CF_3\end{smallmatrix}$$

which comprises:
(a) reacting at a temperature of from about 0° to about 150° C. for at least 0.25 hour, chlorobromomethane with perfluoroacetone in the presence of an alkali metal fluoride and an inert organic solvent, and
(b) subjecting the resulting product mixture to a liquid-liquid separation procedure thereby separating and recovering the halogenated ether.

References Cited
UNITED STATES PATENTS

| | | | |
|---|---|---|---|
| 3,331,813 | 7/1967 | Pittman et al. | 260—614(F) |
| 3,382,222 | 5/1968 | Pittman et al. | 260—614(F) |
| 3,409,512 | 11/1968 | Anello et al. | 260—614(F) |
| 2,917,548 | 12/1959 | Dixon | 260—614 |
| 3,362,180 | 1/1968 | Eiseman | 260—614X |

FOREIGN PATENTS

| | | | |
|---|---|---|---|
| 575,899 | 5/1959 | Canada | 260—614(F) |
| 575,900 | 5/1959 | Canada | 260—614(F) |

OTHER REFERENCES

Tiers, Jour. Amer. Chem. Soc., vol. 77 (1955), pp. 6703–06.

Lovelace et al.: Aliphatic Fluorine Chemistry (1958), pp. 164–169.

BERNARD HELFIN, Primary Examiner

U.S. Cl. X.R.

106—2; 252—65, 73; 260—612, 613, 615, 465.6